US010250701B2

(12) United States Patent
Chin et al.

(10) Patent No.: US 10,250,701 B2
(45) Date of Patent: Apr. 2, 2019

(54) METHOD AND SYSTEM FOR DETERMINING AN ACTUAL POINT-OF-INTEREST BASED ON USER ACTIVITY AND ENVIRONMENT CONTEXTS

(71) Applicant: Bayerische Motoren Werke Aktiengesellschaft, Munich (DE)

(72) Inventors: Alvin Chin, Chicago, IL (US); Kasthuri Rengan Nallappa Soundararajan, Schaumburg, IL (US); Clint Woker, St. Charles, IL (US); Jilei Tian, Chicago, IL (US); Michael Karg, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 330 days.

(21) Appl. No.: 15/161,532

(22) Filed: May 23, 2016

(65) Prior Publication Data

US 2017/0339235 A1 Nov. 23, 2017

(51) Int. Cl.
*H04W 74/00* (2009.01)
*H04L 29/08* (2006.01)
*H04W 4/02* (2018.01)
*H04L 12/58* (2006.01)
*H04W 4/029* (2018.01)
*H04W 88/02* (2009.01)
*H04M 1/725* (2006.01)

(52) U.S. Cl.
CPC ............ *H04L 67/18* (2013.01); *H04L 51/32* (2013.01); *H04L 67/22* (2013.01); *H04W 4/023* (2013.01); *H04W 4/029* (2018.02); *H04M 1/72519* (2013.01); *H04M 1/72522* (2013.01); *H04W 88/02* (2013.01)

(58) Field of Classification Search
CPC ......... H04L 67/18; H04L 51/32; H04L 67/22; H04L 29/08657; H04W 4/028; H04W 4/023; H04W 64/00; H04W 4/02; H04W 88/02; H04M 1/72519; H04M 1/72522
USPC ......... 455/456.3, 456.6, 418, 550.1; 701/423
See application file for complete search history.

(56) References Cited

U.S. PATENT DOCUMENTS

| | | | |
|---|---|---|---|
| 9,110,982 B1 * | 8/2015 | Welsh | H04W 4/21 |
| 2009/0005987 A1 * | 1/2009 | Vengroff | G06Q 30/02 701/300 |
| 2011/0183645 A1 * | 7/2011 | Chawla | H04M 3/42357 455/410 |
| 2011/0313649 A1 * | 12/2011 | Bales | G01C 21/20 701/455 |
| 2012/0124176 A1 | 5/2012 | Curtis et al. | |
| 2013/0073366 A1 * | 3/2013 | Heath | G06Q 30/0259 705/14.25 |

(Continued)

*Primary Examiner* — Danh C Le
(74) *Attorney, Agent, or Firm* — Crowell & Moring LLP

(57) ABSTRACT

The disclosure is directed to determining an actual point-of-interest (POI). For example, using at least one computing device, a first set of probable POIs corresponding to a first geographical location and first POI category information may be determined. The at least one computing device may also be used to determine a second set of probable POIs corresponding to a second geographical location and determine second POI category information. By analyzing the first and second POI category information, the actual POI from the first and second set of probable POIs may be determined.

18 Claims, 7 Drawing Sheets

(56) References Cited

U.S. PATENT DOCUMENTS

| | | |
|---|---|---|
| 2013/0262457 A1 | 10/2013 | Lian et al. |
| 2014/0370844 A1 | 12/2014 | Lara et al. |
| 2015/0038174 A1* | 2/2015 | Chu ................... H04W 4/029 455/456.3 |
| 2015/0161439 A1 | 6/2015 | Krumm et al. |
| 2015/0339686 A1* | 11/2015 | Garcia ............... G06Q 30/0204 705/7.34 |
| 2016/0267324 A1* | 9/2016 | Shoaib ............... G06K 9/00536 |
| 2017/0053619 A1* | 2/2017 | Husain .................. G09G 5/10 |
| 2017/0068990 A1* | 3/2017 | Ogden ............... G06Q 30/0255 |

\* cited by examiner

| POI | Number of Visits | POI Rating | Number of Check-Ins |
|---|---|---|---|
| City Cathedral | 100 | 8 | 42 |
| City Train Station | 50 | 6 | 20 |
| ABC Convenient Store | 30 | 5 | 10 |
| City Health Center | 20 | 7 | 2 |

| POI Near User's Visited Place | Category |
|---|---|
| City Cathedral | Church, Sights, Museums |
| City Train Station | Transportation, Subway |
| ABC Convenient Store | Supermarket, Food |

FIG. 7B

| POI at User's Next Location | Category |
|---|---|
| City Cathedral | Church, Sights, Museums |
| One City Place | Residence, Residential Building |
| City Sports | Sports, Store |

METHOD AND SYSTEM FOR DETERMINING AN ACTUAL POINT-OF-INTEREST BASED ON USER ACTIVITY AND ENVIRONMENT CONTEXTS

BACKGROUND ART

The invention relates to determining a point-of-interest (POI) that accurately indicates the actual location of a user based on various types of information, such as user activity contexts, environment contexts, social contexts, and crowd-sourced data.

Many times, people do not specifically keep track of and/or record the various places they visit. To alleviate this problem, some location-based social applications allow users to record and share the various places and physical locations that they visit in real-time. For example, these applications may be configured to record and/or track the various places that the users visit over a particular period of time, and allow the users to "check-in" to certain places that they want to share with friends and the public as their points or places of interest.

However, these location-based applications are limited and deficient in various ways. For instance, the POIs recorded by the applications may not accurately indicate the actual location of the users, especially if there are other POIs within the same geographical vicinity, such as a shopping mall, and/or if the users park their vehicles in a location relatively far away from the actual POI and subsequently moves from the parking location to another location.

In that regard, there is a need to automatically determine the user's actual POI based on various types of contexts.

SUMMARY OF THE INVENTION

According to one example of the present disclosure, a method for determining an actual point-of-interest (POI) is provided. The method includes determining, using at least one computing device, a first set of probable POIs corresponding to a first geographical location and determining, using the at least one computing device, first POI category information that may include one or more of: (i) at least one POI category for each POI in the first set of probable POIs and (ii) at least one POI category associated with user activity corresponding to the first geographical location. By analyzing the first POI category information, the actual POI may be determined from the first set of probable POIs.

According to another example of the present disclosure, a non-transitory computer-readable medium including a set of executable instructions is provided. The set of executable instructions when executed by at least one processor causes the at least one processor to perform a method for determining an actual point-of-interest (POI), where the method includes determining a set of probable POIs corresponding to a geographical location and determining POI category information including one or more of: (i) at least one POI category for each POI in the set of probable POIs and (ii) at least one POI category associated with user activity corresponding to the geographical location. The method also includes determining the actual POI from the set of probable POIs by analyzing the POI category information.

According to yet another example of the present disclosure, a system for determining an actual point-of-interest (POI) is provided. The system may include at least one computing device executing stored program instructions to determine a set of probable POIs corresponding to a geographical location, determine POI category information including one or more of: (i) at least one POI category for each POI in the set of probable POIs and (ii) at least one POI category associated with user activity corresponding to the geographical location, and determine the actual POI from the set of probable POIs by analyzing the POI category information.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 illustrates a table containing POI information related to number of visits, ratings, and number of check-ins in accordance with one or more aspects of the disclosure.

FIG. 7A illustrates another table containing metadata for POIs near a location in accordance with one or more aspects of the disclosure.

FIG. 7B illustrates yet another table containing metadata for POIs near a next location in accordance with one or more aspects of the disclosure.

DETAILED DESCRIPTION OF EMBODIMENTS OF THE INVENTION

The present disclosure is directed to determining a POI that accurately indicates the actual geographical location of a user based at least in part on various types of information. For example, there may be numerous POIs within the geographical vicinity of a geographical location. To determine the actual POI that corresponds with the location, a list of probable POIs that may be near the location is first determined based on different factors, such as threshold distances, POIs visited by other users, data relating to number of visits, ratings, and number of check-ins, and/or quality scores of the POIs.

In one aspect of the disclosure, once a list of probable POIs has been generated, the probable POIs may be narrowed down based on contexts related to the user's activities and POI categories associated with either the user's activities near/at that location or the POI itself. For example, it may be determined that the user has walked to the location and is continuing to walk to the user's next location. Based on this context, for example, it may be determined that the POI is not a train station since the user is still walking.

In another aspect of the disclosure, a second list of probable POIs associated with the user's next location may be generated. The second set of probable POIs may also be narrowed down based on contexts related to the user's activities at the next location and POI categories associated with either the user's activities near/at the next location or the POI itself. In order to filter out the "negative" probable POIs (e.g., the probable POIs that likely are not the actual POI) in either the first list or second list, or both, the probable POIs and/or their respective category information (near/at the first and next locations) may be compared to find any commonalities. For example, a POI having one or more categories in common may strongly indicate that the POI is an actual POI.

The present disclosure may be implemented on one or more computing devices. For example, a user may use a mobile computer, such as a smartphone, to launch and run an application that is directed to determining an actual POI. In another example, an in-vehicle computer of a vehicle may launch and run the application. In a further example, the application may operate on both the smartphone and in-vehicle computer, simultaneously. Moreover, POIs and related information may be outputted via a display, such as a smartphone display, a head-up display, etc.

Figure 1:
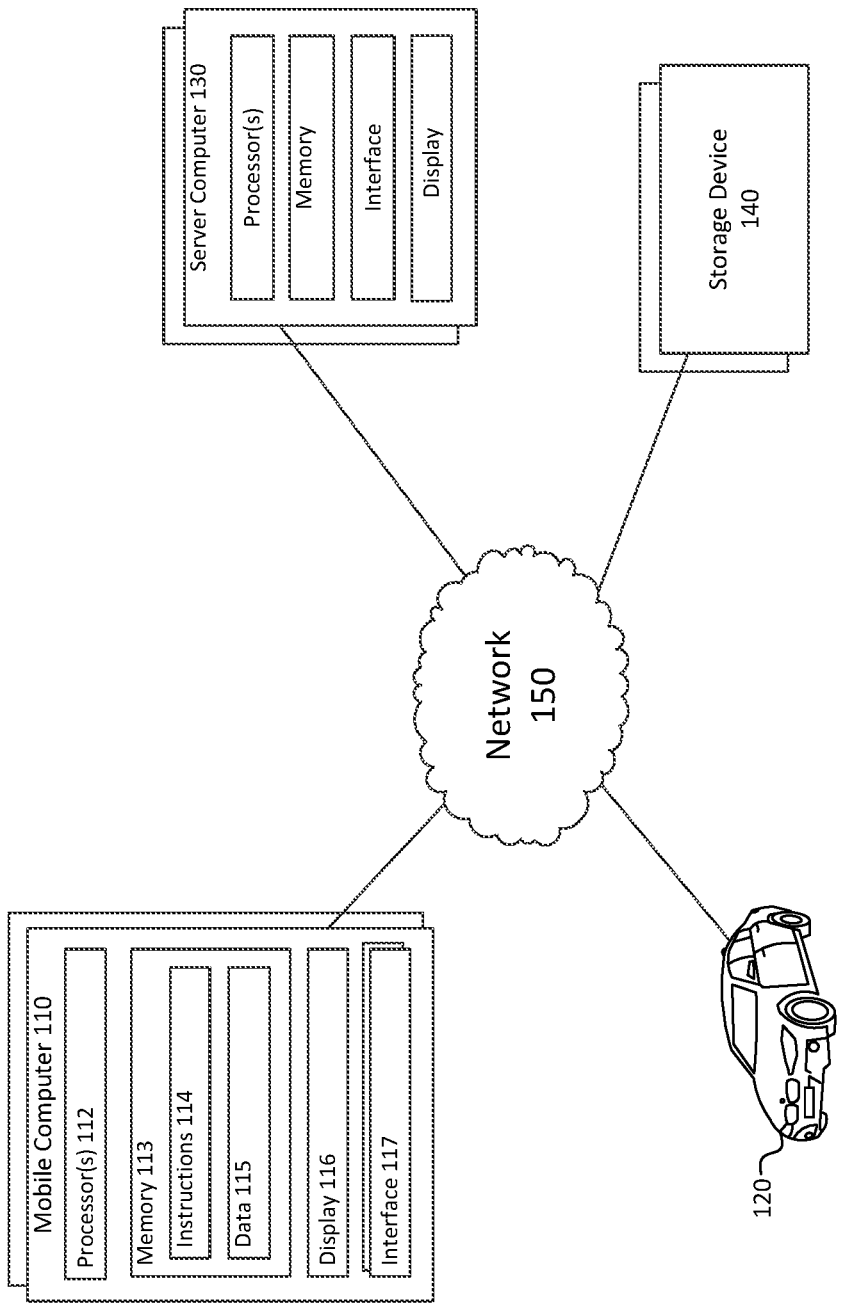
FIG. 1 illustrates a system in accordance with one or more aspects of the disclosure.

FIG. 1 illustrates an example of a system 100 in accordance with one or more aspects of the disclosure. A user (e.g., driver, passenger, etc.) may download an application for determining an actual POI, or alternatively may download an application that includes the POI feature (among other features), onto mobile computer 110 via network 150. For instance, the mobile computer 110 may download the application from server computer 130 or storage device 140 of network 150, which may be any type of network, such as LAN, WAN, Wi-Fi, Bluetooth, etc. Similarly, the user may download the application onto an in-vehicle computer (not shown) of vehicle 120 via network 150. In some examples, the in-vehicle computer and the mobile computer 110 may be communicatively coupled to each other using a wired or wireless connection (e.g., Bluetooth). In that regard, communication between the in-vehicle computer and the mobile computer 110 may be automatically initiated when the user starts the application on the mobile computer 110, or initiates the application using the in-vehicle computer.

The mobile computer 110 may be any type of mobile device with computing capability and/or connectivity to a network, such as a laptop, smartphone, PDA, tablet computer, etc. The mobile computer 110 may include at least one or more processors 112, memory 113, display 116, and interface 117. The processor 112 may instruct the components of mobile computer 110 to perform various tasks based on the processing of information and/or data that may have been previously stored or have been received, such as instructions 114 and/or data 115 stored in memory 113. The processor 112 may be a standard processor, such as a central processing unit (CPU), or may be a dedicated processor, such as an application-specific integrated circuit (ASIC) or a field programmable gate array (FPGA).

Memory 113 stores information and/or data that can be accessed by processor 112, including instructions 114 executable by the processor 112 and data 115 (which can be retrieved, manipulated and/or stored by the processor 112 in accordance with the set of instructions 114 or other sets of executable instructions). The instructions 114 may be software that can be implemented on the mobile computer 110. The data 115 may include various types of information, such as location information associated with a user's first location and next location, information about POIs visited by other users, POI check-in information from other users, sensor data from mobile computers and/or vehicles, data from software and services, information provided by the user, POI information provided by third-parties, etc. The data 115 may be transmitted to the in-vehicle computer of vehicle 120, server computer 130, and/or storage device 140 which may also store the data 115.

The display 116 may be any type of device capable of outputting and/or communicating data to a user, such as a liquid-crystal display ("LCD") screen, a plasma screen, etc. Interface 117 may be a device, port, or a connection that allows a user to communicate with the mobile computer 110, including but not limited to a touch-sensitive screen, microphone, camera, and may also include one or more input/output ports, such as a universal serial bus (USB) drive, various card readers, etc.

Vehicle 120 may be any vehicle capable of transporting one or more individuals from one geographical location to another geographical location. While FIG. 1 illustrates a sedan, it is understood that the vehicle 120 is not limited thereto and may be any type of vehicle, such as a sport utility vehicle, a pickup truck, a coupe, a self-driving car, etc. The vehicle 120 may also include different types of sensors, such as speed, engine, image sensors, to acquire data and information about the vehicle and its user(s). It is understood that any reference to "driver" or "user" in the present disclosure may also include one or more passengers. The vehicle 120 may include an in-vehicle computer with components (including a head-up display) similar to mobile computer 110, as described above, and may be communicatively coupled either directly or indirectly to the mobile computer 110 (or other connected devices on network 150). The in-vehicle computer may be, for instance, physically located within a housing of the vehicle 120, such as the dashboard or the like.

The server computer 130 may include components similar to the mobile computer 110 and in-vehicle computer of vehicle 120. The server computer 130 (and additional server computers) may be rack mounted on a network equipment rack and/or located, for instance, in a data center. Moreover, the storage device 140 illustrated in FIG. 1 may be configured to store large quantities of instructions, data, and/or information similar to instructions 114 and data 115.

Figure 2:
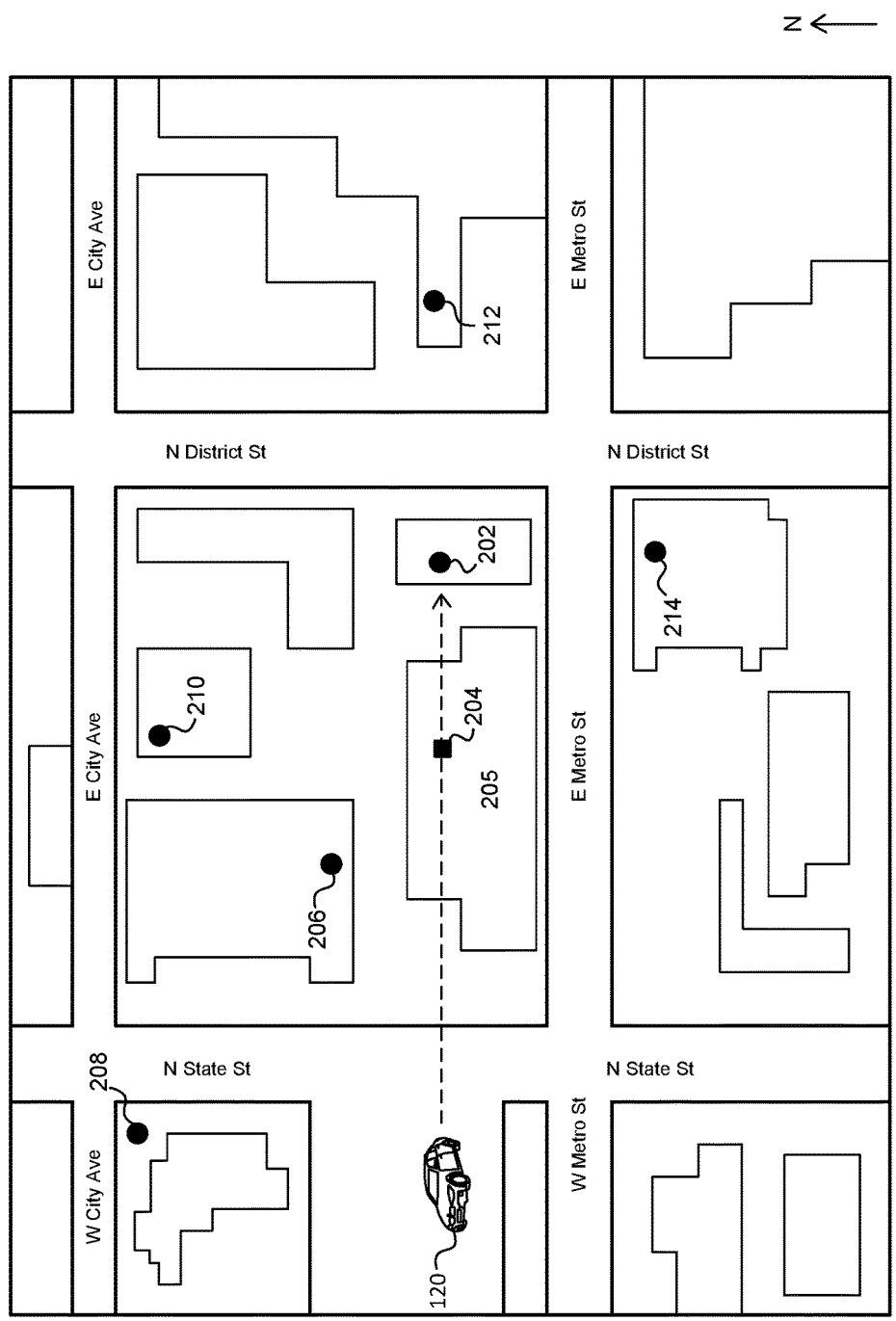
FIG. 2 illustrates a map showing various POIs in accordance with one or more aspects of the disclosure.

FIG. 2 illustrates a map 200, which shows an aerial view of a particular portion of a city, in accordance with one or more aspects of the disclosure. For example, map 200 shows two roads that extend in the east-to-west direction (e.g., City Avenue, Metro Street) intersecting two roads that extend in the north-to-south direction (e.g., State Street, District Street). "Blocks" may be formed by the intersecting roads (for instance, at least nine blocks are adjacent to one or more of the four roads in FIG. 2), and various buildings and structures may be located on each of those blocks.

Map 200 also shows at least six different points-of-interest (POIs) at different geographical locations, illustrated by dots 202, 206, 208, 210, 212, and 214. By way of example only, dot 202 represents a cathedral (e.g., "City Cathedral"), dot 206 represents a counseling center (e.g., "City Health Center"), dot 208 represents a subway station (e.g., "City Train Station"), dot 210 represents a convenient store (e.g., "ABC Convenient Store"), dot 212 represents a sporting goods store (e.g., "City Sports"), and dot 214 represents a residential building (e.g., "One City Place").

A user may initiate and run the application for determining an actual POI using mobile computer 110 (e.g., smartphone) and/or the in-vehicle computer of vehicle 120 in accordance with the one or more aspects of the disclosure. As shown in FIG. 2, the user may be planning on attending afternoon mass at City Cathedral, and in that regard, the actual POI will be understood to be the City Cathedral, dot 202. Due to parking limitations, the user may be required to park vehicle 120 relatively far away from City Cathedral, for instance, in a west-side parking lot located across North State Street (which may be considered the user's first place of visit or known as the first location). From the parking lot, the user may walk in a straight direction through a "next" location point (represented by square 204) within mall complex 205 to City Cathedral at dot 202. In that regard, the "actual" POI will be understood to be the City Cathedral at dot 202 as opposed to other POIs near the geographical vicinity of either the parking lot, the City Cathedral, or both, such as the City Health Center, City Train Station, ABC Convenient Store, City Sports, and One City Place, as represented by the dots 206, 208, 210, 212, and 214, respectively.

Figure 3:
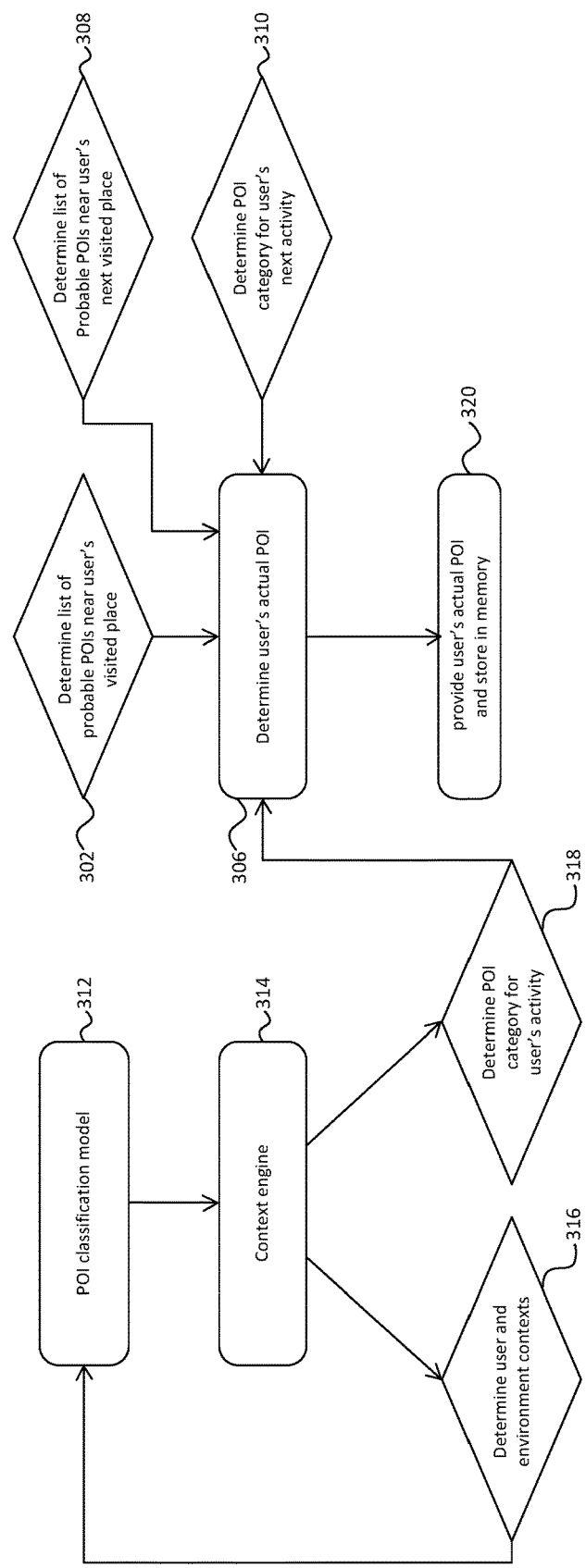
FIG. 3 illustrates a flow diagram for determining an actual POI in accordance with one or more aspects of the disclosure.

FIG. 3 illustrates a flow diagram 300 for determining an actual POI in accordance with one or more aspects of the disclosure. It is to be understood that the phrases "flow diagram" and "algorithm" may be interchangeable.

Figure 4:
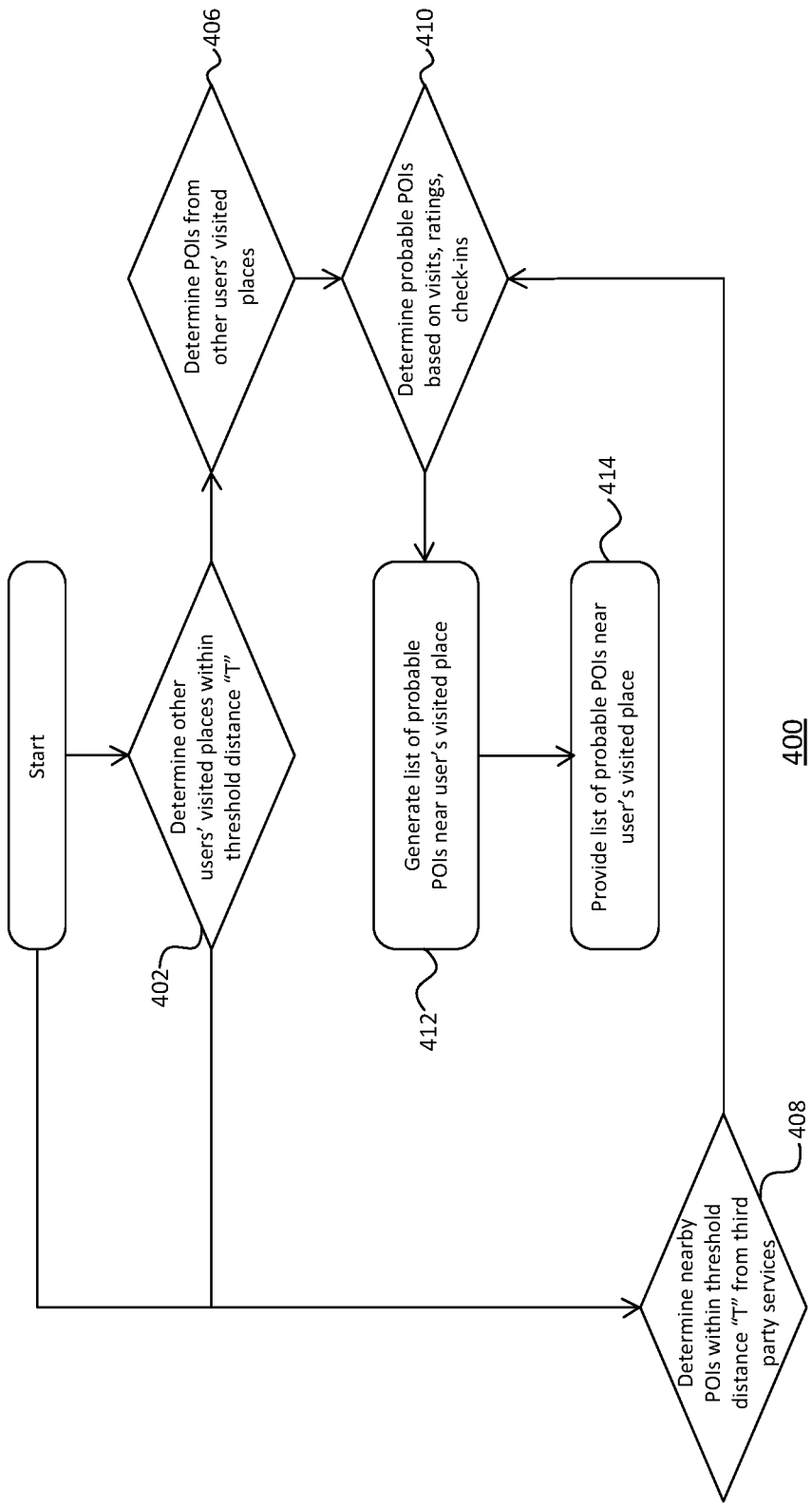
FIG. 4 illustrates another flow diagram for determining probable POIs in accordance with one or more aspects of the disclosure.

As shown in the flow diagram 300, one or more computing devices, such as the mobile computer 110 and/or the in-vehicle computer of FIG. 1, may first determine and/or identify, at block 302, probable POIs near the user's place of visit (at a first location, such as the parking lot in FIG. 2) based on various types of information, such as nearby places that were previously visited by the user, other nearby places that were visited by other users, POIs that have been selected by other users (such as check-ins), and other nearby POIs from third parties or third party services, which will be further discussed below with respect to at least FIG. 4. Thereafter, the determined list of probable POIs may be used, in part, to determine and obtain the user's actual POI at block 306, and provided to the user and/or stored in memory at block 320, as will be further described below.

In addition to the list of probable POIs near the place visited by the user, a list of probable POIs near the user's next place of visit (at a second location, such as square 204 within mall complex 205 in FIG. 2) is determined at block 308 and used to determine the actual POI at block 306. It is understood that information related to the user's next place of visit may be used to more accurately determine the user's actual POI, but is not a requirement to determine the actual POI. Moreover, POI category information associated with the POIs as well as the user's activity near/at the user's first location and the user's next location is determined at blocks 318 and 310, respectively, which are also used in determining and providing the user's actual POI at blocks 306 and 320.

Determination of POI category information may be based on one or more POI classification models (further discussed below with respect to at least FIG. 6) and a context engine. For example, using the context engine at block 314, user and environment contexts may be determined to feed into the POI classification model at block 312 so that data therein may be trained. As will be further discussed below, the context engine may receive information from different sources to determine user and environment contexts to at least determine POI category information associated with the user's activity near/at the user's first location at block 318. For example, the information may be sensor data from the mobile computer 110 and/or vehicle 120, information from software used by the user and/or service data associated with the user, and information provided by the user.

Using the algorithm of FIG. 3 based on map 200 in FIG. 2, for example, the actual POI may be determined to be the City Cathedral despite the user having parked the vehicle 120 relatively far away from the actual location of the cathedral. In other words, the City Cathedral is the POI that accurately indicates the user's actual location, as opposed to other but probable POIs near the parking lot (e.g., City Train Station, City Health Center, ABC Convenient Store) and other but probable POIs near the user's next location within mall complex 205 (e.g., City Sports, One City Place).

FIG. 4 illustrates a flow diagram 400 for determining a list of probable POIs (which corresponds to block 302 in FIG. 3) in accordance with one or more aspects of the disclosure. For example, once the location of a place that is first visited by the user (which may be otherwise known as "user's visited place" in the flow diagrams) has been determined (e.g., via a clustering algorithm, user input, GPS) at the "Start" block, such as the parking lot illustrated in FIG. 2, then places (including the one being currently visited by the user) visited by other users within a threshold distance "T" may be determined at block 402. The threshold distance "T," for instance may be 800 meters. Using this information, POIs corresponding to the places visited by other users may be determined at block 406. For example, the POIs corresponding to the other users' visited places may be the City Cathedral and the City Train Station, which may fall within the threshold distance "T" and eventually stored in memory of the one or more computing devices for further and/or later use.

Moreover, at block 408, nearby POIs obtained from third-party services (using third-party POI databases) within the threshold distance "T" may be determined. For example, one or more third-party services may indicate that the City Cathedral, the ABC Convenient Store, the City Train Station, and the City Health Center are the nearby POIs that are within the threshold distance. Based on the POIs determined at blocks 406 and 408, probable POIs may be determined at block 410 using information relating to number of visits, ratings, and number of check-ins for each POI, which will be further discussed below with respect to at least FIG. 5. A list of POIs may be generated at block 412 and provided at block 414 (which is used at block 304 in the flow diagram 300 of FIG. 3).

As described above, the probable POIs determined at block 410 may be based on information/data related to number of visits, ratings, and number of check-ins for all the POIs determined at block 406. Using this information a POI quality score for each of the POIs may be calculated to determine which POIs are "probable." The POI quality score, for example, may be used to rank each POI based on the number of visits (e.g., a single visit may be considered a user being at the POI for a certain period of time defined by a threshold), the POI rating by the users (e.g., on a scale of 1 to 10 where 1 is the lowest and 10 is the highest), and the number of check-ins at the POI, all of which may take into account user feedback and social interactions with the POIs from the user as well as other users. Moreover, the POI quality score may be able to reconcile discrepancies associated with a significantly high number of users who check into a particular POI over a different POI.

By way of example only, FIG. 5 illustrates table 500 containing information related to the number of visits, ratings, and number of check-ins for different POIs in accordance with one or more aspects of the disclosure. As shown in table 500, the POIs may be the City Cathedral, the City Train Station, the ABC Convenient Store, and the City Health Center.

The first row, for example, specifies that the City Cathedral has 100 visits, a POI rating of 8, and 42 user check-ins. Similarly, as specified in the second row, the City Train Station has 50 visits, a POI rating of 6, and 20 user check-ins. Moreover, the ABC Convenient Store has 30 visits, a POI rating of 5, and 10 user check-ins. Finally, table 500 shows that the City Health Center has 20 visits, a POI rating of 7, and 2 user check-ins.

The POI quality score may be determined as a weighted average feature function, as described by the following equation:

$$POI_{quality}=a_{visits}f_{visits}+a_{rating}f_{rating}+a_{check-ins}f_{check-ins}$$

Where $POI_{quality}$ is the POI quality score, a represents a weight value (e.g., between 0 and 1) for the feature, and f represents the frequency for the feature. In that regard, for instance, $a_{visits}$ is the weight value for the number of visits to the POI, $a_{rating}$ is the weight value for the POI rating feature, and $a_{check-ins}$ is the weight value for the number of check-ins to the POI. Moreover, the frequency is calculated as the number of times associated with the feature divided by the sum of the number of times for the feature for all POIs that are identified from blocks 402, 406 and 408 in FIG. 4.

The frequencies for each feature may be determined using the below equation:

$$f_{visits} = \frac{n_{visits}}{n_{visits\ to\ all\ POIs}},\ f_{rating} = \frac{n_{rating}}{n_{rating\ for\ all\ POIs}},$$

$$f_{check-ins} = \frac{n_{check-ins}}{n_{check-ins\ to\ all\ POIs}}$$

Using the information in table 500 of FIG. 5, assuming all the features are equally weighted (e.g., $a_{visits}=0.33$, $a_{rating}=0.33$, $a_{check-ins}=0.33$), and incorporating the frequency equations into the POI quality score equation, the POI quality scores for each POI can be computed, which may be as follows:

$POI_{City\ Cathedral}=(0.33)*(100/200)+(0.33)*(8/26)+(0.33)*(42/74)=0.454$ $POI_{City\ Train\ Station}=(0.33)*(50/200)+(0.33)*(6/26)+(0.33)*(20/74)=0.330$ $POI_{ABC\ Convenient\ Store}=(0.33)*(30/200)+(0.33)*(5/26)+(0.33)*(10/74)=0.158$ $POI_{City\ Health\ Center}=(0.33)*(20/200)+(0.33)*(7/26)+(0.33)*(2/74)=0.130$ Based on the calculations, it can be seen that the City Health Center has the lowest quality score, and therefore, the list of probable POIs near the place visited by the user may include the City Cathedral, the City Train Station, and the ABC Convenient Store while the City Health Center may be excluded from the list. Exclusion may be based on having a value below or lower than a predetermined threshold value, such as 0.150 in the example shown in table 500.

To narrow down the list of probable POIs to one or more actual POI candidates, POI category/type information may be used, which may be determined based on user activity and environment contexts, the process for which is described in at least blocks 314 (the context engine), 316, and 318 of FIG. 3, as described above.

There are numerous sources of context that may be obtained from the user and the environment, which may be input into the context engine, such as (1) location of the user, (2) sensor data (e.g., data from sensors on the user's mobile computer such as audio, data from sensors of the user's vehicle to indicate when the user stops the ignition of the vehicle and leaves the vehicle), (3) user's software and service data (e.g., software running on the user's mobile computer indicating what the user may have been previously doing or where the user was previously located), and/or (4) user provided information (e.g., type of activity specified by the user). Based on this information, user and environment context data may be used to train a POI classification model, data from which feeds back into the context engine, as seen in FIG. 3, to allow POI category information associated with the POI and the user's activity near/at the POI to be determined.

For example, location and activity data may be obtained from the user, which may define mode of transport for either arriving to or leaving the location, such as "car," "vehicle," "walking," "train," etc. By way of an additional example, sensor data, software and service data, and information provided by the user may be used together to determine that the user's activity is, for instance, parking the vehicle 120 in a parking lot, or that the user is walking into a church based on audio sensor data (e.g., singing in the church). Sensors located in vehicle 120, for example, may indicate that the user has stopped the vehicle at a particular location, put the vehicle 120 in the "park" position, and exited the vehicle by opening and shutting the vehicle door. Moreover, sensors located in the mobile computer 110 of the user may obtain audio data for audio-based context recognition to identify the surrounding environment, such as singing/music originating from the City Cathedral, for instance.

The user activity and environment contexts may be used to generate, maintain, and train a POI classification model (e.g., the POI classification at block 312 in FIG. 3), which may provide POI category information used in the algorithm for determining the actual POI. As noted above, the POI category information is used by the context engine. By way of example, a POI category may be called "church" and data related to user activity and environment from all the users that have checked into a POI that falls under the "church" category may be aggregated. Based on the category information from the POI classification model, POI categories for each of the user's probable POIs may be determined and ranked. Moreover, the POI classification model may be trained over a period of time with data from each user at the POI.

Figure 6:
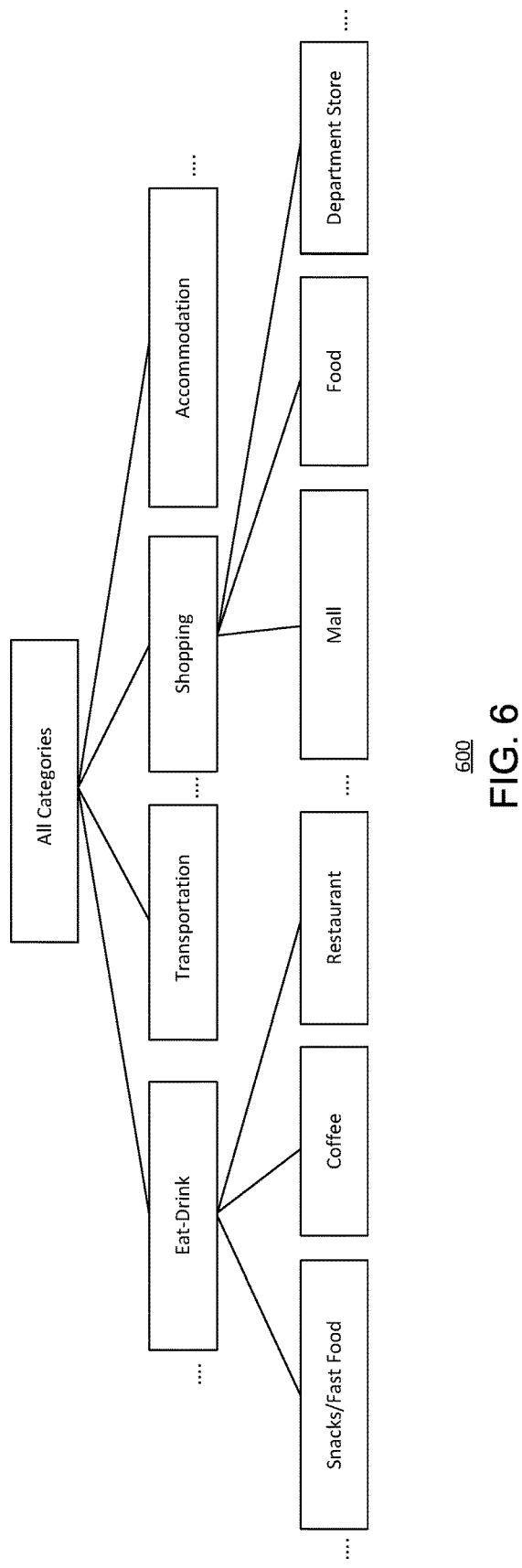
FIG. 6 illustrates a POI classification model in accordance with one or more aspects of the disclosure.

FIG. 6 illustrates an example POI classification model 600 in accordance with one or more aspects of the disclosure. As shown, the classification model 600 may be defined by a POI category taxonomy, which may be arranged in a hierarchical and/or flat manner. Each node of the taxonomy may contain a category or an associated category "classifier" related to a particular POI, which may be learned over time and may also be based on various data, such as user check-in data. By way of example, FIG. 6 shows that under the top-most node, "All Categories," there are four different POI category nodes: "Eat-Drink," "Transportation," "Shopping," and "Accommodation." Under those POI category nodes, there may be one or more POI classifier nodes giving context to the respective categories. For instance, the "Eat-Drink" node includes at least a "Snacks/Fast Food" classifier node, a "Coffee" classifier node, and a "Restaurant" classifier node. Likewise, the "Shopping" node includes at least a "Mall" classifier node, a "Food" classifier node, and a "Department Store" classifier node. It is understood that there may be additional POI category nodes and additional POI classifier nodes, as indicated by the ellipses.

For each POI category node, context data related to the user (e.g., user's activity) and/or the environment may be inputted. By way of example, user context data may be formatted as follows, user_context=[walking, duration; stationary, duration; . . . ], and the environmental context data may be formatted as follows, env_context=[street, probability, duration; restaurant, probability, duration; . . . ]. As shown in FIG. 6, the category classifier classifies a context to an associated category and may be trained based on the context feature of the category. For instance, a possible classifier may be based on a decision tree, a support vector machine (SVM), neural network, etc. Based on the POI classification model, such as classification model 600, probable POI categories for the POI may be ranked and a POI category ultimately determined.

From the list of probable POIs identified and determined at blocks 302 and 304 in FIG. 3, an actual POI may be determined by filtering the probable POIs based on "next" location data. For instance, users may move from one geographical place to another geographical place and the user may transition from one form of activity to another activity, such as walking to taking a train. If the location and activity transitions are recorded, the actual POI may be accurately determined. By way of example, filtering the probable POIs may involve at least four features: (1) metadata for POIs near place visited by the user, (2) metadata for POIs user's next location, (3) user's activity associated with place visited by the user, and (4) user's next activity at the next location.

As described above, the POI quality score calculations generated a list of probable POIs that includes the City Cathedral, the City Train Station, and the ABC Convenient Store. FIG. 7A illustrates a table containing metadata for the POIs near the place visited by the user (City Cathedral parking lot as shown in FIG. 2) in accordance with one or more aspects of the disclosure. For example, the metadata may include POI category obtained from the context engine and/or third-party POI services. In that regard, as shown, the category for the City Cathedral is "Church, Sights, Museums," the category for the City Train Station is "Transportation, Subway," and the category for the ABC Convenient Store is "Supermarket, Food." Although not shown, the metadata may include categories corresponding to the user's activity associated with the visited place, such as activity prior to arriving at the place (e.g., driving, walking, etc.), activity leaving that place to the user's next location (e.g., walking, taking the train, etc.).

FIG. 7B illustrates a table containing metadata for POIs near the user's next location (square 204 within mall complex 205 as shown in FIG. 2) in accordance with one or more aspects of the disclosure. The table shows that the POIs most likely to be near the user's next location, square 204, is the City Cathedral, One Superior Place, and City Sports, where the category for One Superior Place being "residential building" and the category for City Sports being "sports, store." The probable POIs near the user's next location may be determined based on location data associated with the user's next location and determined in a manner similar to the above-description with respect to the place visited by the user (the user's visited place). For example, threshold distance used to determine whether POIs are included the list may be shorter, equal, or greater in length than the threshold distance "T" used for the "previous" or "original" visited place. The categories for those POIs may be based on the POI classification model and/or context engine, as described above. Similar to the table in FIG. 7A, the metadata for the user's next location may also include category data corresponding to the user's activity associated with that next location.

Comparing the tables in FIGS. 7A and 7B, it can be seen that City Cathedral is common to both tables. Moreover, it may be determined that the user went to the next location within a short period of time (as determined from the metadata, time not shown in the tables). Given this, there is a high likelihood that the user's actual POI is the City Cathedral, and thus, the City Train Station, the ABC Convenient Store, One Superior Place, and City Sports may be determined to be "negative" actual POIs and subsequently filtered out. Referring back to FIG. 2 in context with the flow diagrams 300 and 400 of FIGS. 3 and 4, the user's actual POI—the City Cathedral—can thus be determined with high accuracy based on various contexts at two locations (the parking lot and the "next" location within mall complex 205).

Once the actual POI has been determined, it can be stored in memory and may be used by one or more location-based applications and/or services (such as GPS and map applications) as well as social networking applications and/or services (such as check-in services) in order to make, user experience while driving or exploring a city, for instance, more convenient and enjoyable.

Numerous advantages of the present disclosure, include but are not limited to, (1) automatically and accurately recording various POIs and other visited places without the user having to input POI or check into the POI, (2) searching and subscribing to related information, (3) providing various types of information to users based on accurate POI information, such as advertising, (4) creating labels for a given location, (5) personalizing data and context associated with the user and relevant POIs, (6) using crowd-sourced information from other users who have visited or checked into the user's POIs, (7) adding more data to POI analysis, such as vehicle sensor and condition data, and (8) using user activity and context (e.g., audio) data to improve accuracy and relevancy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure uses terminology and acronyms that may not be familiar to the layperson, those skilled in the art will be familiar with the terminology and acronyms used herein.

The invention claimed is:

1. A method for determining an actual point-of-interest (POI), the method comprising the acts of:

determining, using at least one computing device, a first set of probable POIs corresponding to a first geographical location corresponding to a user's first place of visit;

determining, using the at least one computing device, first POI category information including one or more of: (i) at least one POI category for each POI in the first set of probable POIs and (ii) at least one POI category associated with user activity corresponding to the first geographical location;

determining, using the at least one computing device, a second set of probable POIs corresponding to a second geographical location corresponding to corresponding to a user's next place of visit after the user's first place of visit;

determining, using the at least one computing device, second POI category information including one or more of: (i) at least one POI category for each POI in the second set of probable POIs and (ii) at least one POI category associated with user activity corresponding to the second geographical location; and determining, using the at least one computing device, the actual POI from the first and second sets of probable POIs by analyzing the first and second POI category information.

2. The method of claim 1, further comprising:
    storing, using the at least one computing device, the actual POI in memory; and
    using the actual POI in one or more of: (i) a location-based application or service and (ii) a social-based application or service.

3. The method of claim 1, wherein the at least one computing device includes one or more of: (i) an in-vehicle computer, (ii) a mobile computer, and (iii) a server computer.

4. The method of claim 1, further comprising providing, using the at least one computing device, the actual POI to a user, wherein the act of providing the actual POI comprises outputting, using the at least one computing device, the actual POI to the user via a display, the display including at least a head-up display.

5. The method of claim 1, wherein the analysis of the first and second POI category information includes comparing the first and second POI category information for one or more commonalities.

6. The method of claim 1, wherein the step of determining the second set of probable POIs further comprises:
    determining, using the at least one computing device, one or more first POIs based on locations visited by other users within a predetermined threshold distance from the second geographical location;
    determining, using the at least one computing device, one or more second POIs provided by at least one third-party service within the predetermined threshold distance from the second geographical location; and
    determining, using the at least one computing device, the second set of probable POIs based on a POI quality score of each of the one or more first and second POIs.

7. The method of claim 6, wherein the POI quality score is defined by using data associated with number of visits, rating, and number of check-ins in accordance with the following equation:

$$POI_{quality} = a_{visits} f_{visits} + a_{rating} f_{rating} + a_{check\text{-}ins} f_{check\text{-}ins}$$

wherein a represents a weight value and f represents a frequency.

8. The method of claim 7, wherein the POI quality score having a value below a predetermined threshold value is not included in the first set of probable POIs.

9. The method of claim 1, wherein the user activity corresponding to the first geographical location includes activity associated with how a user arrives at the first geographical location and activity associated with how the user leaves the first geographical location.

10. The method of claim 1, wherein the user activity corresponding to the second geographical location includes activity associated with how a user arrives at the second geographical location and activity associated with how the user leaves the second geographical location.

11. The method of claim 1, wherein the first and second POI category information is based on information provided by a context engine and a POI classification model.

12. The method of claim 11, wherein the POI classification model includes a plurality of POI categories and a plurality of POI classifiers associated with each POI category of the plurality of POI categories, wherein the POI classification model and the context engine provides user activity contexts and environment contexts.

13. The method of claim 11, wherein the context engine generates information based on one or more of: (i) location of a user, (ii) data from at least one sensor, (iii) software or service data, and (iv) user provided information.

14. The method of claim 13, wherein the at least one sensor includes one or more of: (i) a vehicle sensor and (ii) a sensor of the at least one computing device.

15. A method for determining an actual point-of-interest (POI), the method comprising the acts of:
    determining, using at least one computing device, a first set of probable POIs corresponding to a first geographical location;
    determining, using the at least one computing device, first POI category information including one or more of: (i) at least one POI category for each POI in the first set of probable POIs and (ii) at least one POI category associated with user activity corresponding to the first geographical location; and
    determining, using the at least one computing device, the actual POI from the first set of probable POIs by analyzing the first POI category information, wherein the step of determining the first set of probable POIs further comprises:
    determining, using the at least one computing device, one or more first POIs based on locations visited by other users within a predetermined threshold distance from the first geographical location;
    determining, using the at least one computing device, one or more second POIs provided by at least one third-party service within the predetermined threshold distance from the first geographical location; and
    determining, using the at least one computing device, the first set of probable POIs based on a POI quality score of each of the one or more first and second POIs.

16. The method of claim 15, wherein the POI quality score is defined by using data associated with number of visits, rating, and number of check-ins in accordance with the following equation:

$$POI_{quality} = a_{visits} f_{visits} + a_{rating} f_{rating} + a_{check\text{-}ins} f_{check\text{-}ins}$$

wherein a represents a weight value and f represents a frequency.

17. The method of claim 16, wherein the POI quality score having a value below a predetermined threshold value is not included in the first set of probable POIs.

18. A non-transitory computer-readable medium comprising a set of executable instructions, the set of executable instructions when executed by at least one processor causes the at least one processor to perform a method for determining an actual point-of-interest (POI), the method comprising the acts of:
    determining a first set of probable POIs corresponding to a geographical location corresponding to a user's first place of visit;
    determining POI category information including one or more of: (i) at least one POI category for each POI in the set of probable POIs and (ii) at least one POI category associated with user activity corresponding to the geographical location;
    determining, using the at least one computing device, a second set of probable POIs corresponding to a second geographical location corresponding to corresponding to a user's second place of visit after the user's first place of visit;
    determining, using the at least one computing device, second POI category information including one or more of: (i) at least one POI category for each POI in the second set of probable POIs and (ii) at least one POI category associated with user activity corresponding to the second geographical location; and determining the actual POI from the first and second sets of probable POIs by analyzing the first and second POI category information.

* * * * *